US006831898B1

(12) United States Patent
Edsall et al.

(10) Patent No.: US 6,831,898 B1
(45) Date of Patent: Dec. 14, 2004

(54) MULTIPLE PACKET PATHS TO IMPROVE RELIABILITY IN AN IP NETWORK

(75) Inventors: Thomas J. Edsall, Cupertino, CA (US); Silvano Gai, San Jose, CA (US); Soei-Shin Hang, Sunnyvale, CA (US)

(73) Assignee: Cisco Systems, Inc., San Jose, CA (US)

(*) Notice: Subject to any disclaimer, the term of this patent is extended or adjusted under 35 U.S.C. 154(b) by 806 days.

(21) Appl. No.: 09/593,566

(22) Filed: Aug. 16, 2000

(51) Int. Cl.$^7$ ............................................ H04L 12/28
(52) U.S. Cl. ...................... 370/256; 370/256; 370/261
(58) Field of Search ................................. 370/389, 390, 370/394, 351, 352, 400, 401

(56) References Cited

U.S. PATENT DOCUMENTS

| | | | |
|---|---|---|---|
| 5,088,032 A | | 2/1992 | Bosack |
| 5,138,614 A | * | 8/1992 | Baumgartner et al. ...... 370/261 |
| 5,519,704 A | | 5/1996 | Farinacci et al. |
| 5,950,135 A | * | 9/1999 | Cullen ......................... 455/450 |
| 6,353,596 B1 | * | 3/2002 | Grossglauser et al. ...... 370/256 |
| 6,425,009 B1 | | 7/2002 | Parrish et al. |

OTHER PUBLICATIONS

Stevens, W. Richard, "UDP: User: User Datagram Protocol—TCP/IP Illustrated, vol. 1", 1994, pp. 143–168, Addison Wesley Longman, Inc., Reading, Massachusetts.

Perlman, Radia, "Spanning Tree Algorithm—Interconnections Second Edition, Bridges, Routers, Switches, and Internetworking Protocols", pp. 58–79, Addison Wesley Longman, Inc., Reading, Massachusetts.

Perlman, Radia, "Link State Routing—Interconnections Second Edition, Bridges, Routers, Switches, and Internetworking Protocols", pp. 307–319, Addison Wesley Longman, Inc., Reading, Massachusetts, Sep. 1999.

Schulzrinne, H., et al., "RTP: A Transport Protocol for Real-Time Applications", Network Working Group, Request for Comments 1889, Jan. 1996, pp. 1–63.

* cited by examiner

*Primary Examiner*—Robert W. Wilson
(74) *Attorney, Agent, or Firm*—Cesari and Mckenna, LLP; A. Sidney Johnston, Esq.

(57) ABSTRACT

The invention replicates a packet requiring high availability and transmits it from two or more ports of a switch, for example a wiring closet Layer 2 switch. The parent packet carries a unique sequence number. The copies of the packet each carry the parent packet's unique sequence number. Each copy of the packet then travels on separate pathways through routers (Layer 3 network devices). The pathways are maintained separate by assigning high costs in a LSP routing sense to links connecting the two paths, and by assigning low costs to links along the desired paths. The two identical packets converge on the destination station. The destination station accepts the first packet with a particular sequence number, and discards any later packets with the same sequence number. In the event that a link in one path has a catastrophic failure, then the packet travelling along the other path reaches the destination station and service remains operative without interruption. The lost path is then recomputed by the a router (if any) still receiving the lost packet. A new non-converging path may be selected if any are available, depending upon the topology. After the disruption is repaired, the original dual pathways may once again be established.

36 Claims, 7 Drawing Sheets

MULTIPLE PACKET PATHS TO IMPROVE RELIABILITY IN AN IP NETWORK

BACKGROUND OF THE INVENTION

1. Field of the Invention

This invention relates to reliable transfer of data packets over a computer network, and more particularly to reducing recovery time when a link is lost.

2. Background Information

An application such as voice over IP, that is carrying telephone conversations over a computer network, ordinarily makes use of an unreliable protocol such as the connectionless User Datagram Protocol (UDP). The connectionless UDP protocol is described by W. Richard Stevens in his book TCP/IP Illustrated, Vol. 1, published by Addison Wesley, Copyright date 1994, all disclosures of which are incorporated herein by reference, particularly pages 143–168.

When a packet is lost there is an interruption in the audio of the telephone conversation. However, it is not effective to re-send the lost packet after the conversation with the missing packet has passed the point in time that audio was lost.

Loss of a few seconds of audio packets may occur if a link through which the packets are travelling fails. Recovery of the connection through another link requires time, and may require several seconds using ordinary network protocols. Networks usually are designed with redundant interconnections and the Spanning Tree Protocol, a layer 2 protocol, and the Link State Packet Routing protocol (LSP protocol), a layer 3 protocol, are used to establish a single path through the network. In the event that a link in the established path fails, these protocols then re-establish the connection through different links. However, as noted above, the time required to re-establish a path may be several seconds, for example 10 seconds or more. Such an interruption in a telephone conversation is noticeable and annoying to a person using a telephone connection.

The Spanning Tree Protocol and the Link State Packet Routing Protocol are next discussed, and some other common protocols are mentioned.

The layer 2 Spanning Tree Protocol, and also Layer 3 protocols such as Link State Packet (LSP) Routing, OSPF, and EIGRP, etc., are used to provide loop free data communication through a network having redundant links. These protocols also have recovery mechanisms which re-establish a communication pathway in the event that a chosen pathway suffers a catastrophic failure.

In more detail, the Spanning Tree Protocol eliminates packets travelling in loops in networks having redundant links, where the forwarding decisions are made by reading the fields of the Layer 2 header. The Layer 2 header of a packet has no indication of how long a packet has been travelling in the network, and so in the presence of a loop in the network Layer 2 topology, a packet can circulate endlessly in the network. Loops are eliminated by the Spanning Tree Protocol opening redundant links, thereby leaving a loop free path through the network.

Also, the Spanning Tree Protocol re-establishes communication in the event that a link in the network becomes unusable and data packets are lost. Communication is re-established by, first, the Spanning Tree Protocol setting up a network connection through a network with redundant multiple links between a source end station and a destination end station by selecting a single path through the network. In the event that a link in the selected path becomes in-operative, the Spanning Tree Protocol again executes and selects a new path through the network. However, it takes considerable time for the network devices to become aware that a topological change has occurred in the network, and even more time for the Spanning Tree Protocol to execute and select a new route through the network. And, in a service requiring a high quality of service, such as voice over IP, the loss of connectivity caused by first detecting the loss of connectivity and then by selecting a new path, causes an undesirable interruption in the service. For example, if a telephone conversation goes quiet for 10 seconds, the interruption is quite noticeable and annoying to the user. The Spanning Tree Protocol is described by Radia Perlman in her book *Interconnections, Second Edition*, published by Addison Wesley, Copyright date 2000, all disclosures of which are incorporated herein by reference, especially at pages 58–79.

In Link State Packet Routing (LSP Routing) routers operating at Layer 3 determine a "best" route through the network. A cost is assigned to each link between routers. This assignment of costs is normally done by a network manager. In LSP routing each router learns its neighbor's names and addresses, generates a LSP packet containing a list of all of its known neighbors names and addresses, and the cost of transferring a packet to the neighbor, and then the router sends the LSP packet to all other routers. The receiving routers then build a table of known routers from the received LSP packets. A router needing a route to another router computes various tentative paths. The cost of each path is then computed. The router then selects the least cost path to the other router. Routing paths, at Layer 3, are selected to minimize the cost of establishing a routing pathway, for example, by use of the Dijkstra algorithm, as described by Radia Perlman in the above mentioned book *Interconnections, Second Edition* at pages 307–319. In the event that a link fails or the topology otherwise changes, considerable time is required for the fault to be detected and a new route selected. Again, the elapsed time interval is too great for applications requiring that packets travel from source to destination with minimum delay, and with high reliability. Packets are prevented from circulating endlessly in the event that a loop occurs in Layer 3 forwarding by each packet carrying a "time to live" counter which establishes a maximum number of times which a packet can be forwarded by Layer 3 forwarding.

In the Open Shortest Path First (OSPF) protocol a two Layer hierarchy has a backbone area with discrete areas attached to the backbone. Border routers between the backbone and the discrete areas provide connectivity between an area and the backbone. LSP routing is then used to choose a path through border routers, and the hierarchy helps simplify the route calculations. Again, the elapsed time between occurrence of a fault and the establishment of a new route is too long for a service requiring a high availability such as voice over an IP connection.

Further, routing protocols used by Cisco Systems, Inc. such as the Interior Gateway Routing Protocol (IGRP) and the Extended Interior Gateway Routing Protocol (EIGRP) also require more time than is desired in order to re-establish a connection after a link in the network fails. The IGRP and EIGRP protocols are described further in documents available at the URL:

http://www.cisco.com/warp/public/103/eigrpl.html.

There is needed a method to transfer data packets from a source station to a destination station when a failure occurs along a chosen pathway in the computer network, especially there is needed a method to establish a new path without an unacceptably long delay.

SUMMARY OF THE INVENTION

The invention replicates a packet requiring high availability and transmits it from two or more ports of a switch, for example a wiring closet Layer 2 switch. The parent packet carries a unique sequence number. The copies of the packet each carry the parent packet's unique sequence number. Each copy of the packet then travels on separate pathways through routers (Layer 3 network devices). The pathways are maintained separate by assigning high costs in a LSP routing sense to links connecting the two paths, and by assigning low costs to links along the desired paths. The two identical packets converge on the destination station. The destination station accepts the first packet with a particular sequence number, and discards any later packets with the same sequence number.

In the event that a link in one path has a catastrophic failure, then the packet travelling along the other path reaches the destination station and service remains operative without interruption. A router still receiving the lost packet, where the loss is due to a downstream failure, recomputes a new path. A new non-converging path may be selected if any are available, depending upon the topology. After the disruption is repaired, the original dual pathways may once again be established.

In a preferred embodiment of the invention, a digital telephone is connected to a Layer 2 switch. The layer 2 switch is usually located in a wiring closet of a building, the "initiating switch". The packet travelling from the digital telephone to the initiating switch in the wiring closet uses a "specially assigned" multicast MAC destination address. The specially assigned MAC address is added to all interfaces of the initiating switch that need to receive a packet from a digital telephone. The switch is configured to receive and replicate the packets having the specially assigned MAC address as their MAC DA, for example, the switch is so configured when it executes its initialization routines. The initiating switch replicates the packet using its ordinary multicast process and, responding to the "specially assigned" value, transmits identical packets onto two or more assigned ports. Each of the assigned ports is the starting point for the multiple independent paths to the receiver digital telephone. The packets take separate, non-converging, paths to a receiving Layer 2 switch in a wiring closet connected to the receiving digital telephone. The routers between the initiating Layer 2 switch and the receiving Layer 2 switch maintain separate paths in response to the assignment of costs, in the LSP protocol sense, to the routes.

In an alternative embodiment of the invention, the initiating network device may be a layer 3 router which receives the packets from the digital telephone. In the case that the initiating device is a layer 3 router, again the router is configured to receive the special MAC address and to replicate the packets. For example, the router is so configured when the router executes its initializing routines.

BRIEF DESCRIPTION OF THE DRAWINGS

Turning now to the drawings, in which like numerals represent like parts in the several views.

DETAILED DESCRIPTION OF AN ILLUSTRATIVE EMBODIMENT

Figure 1A:
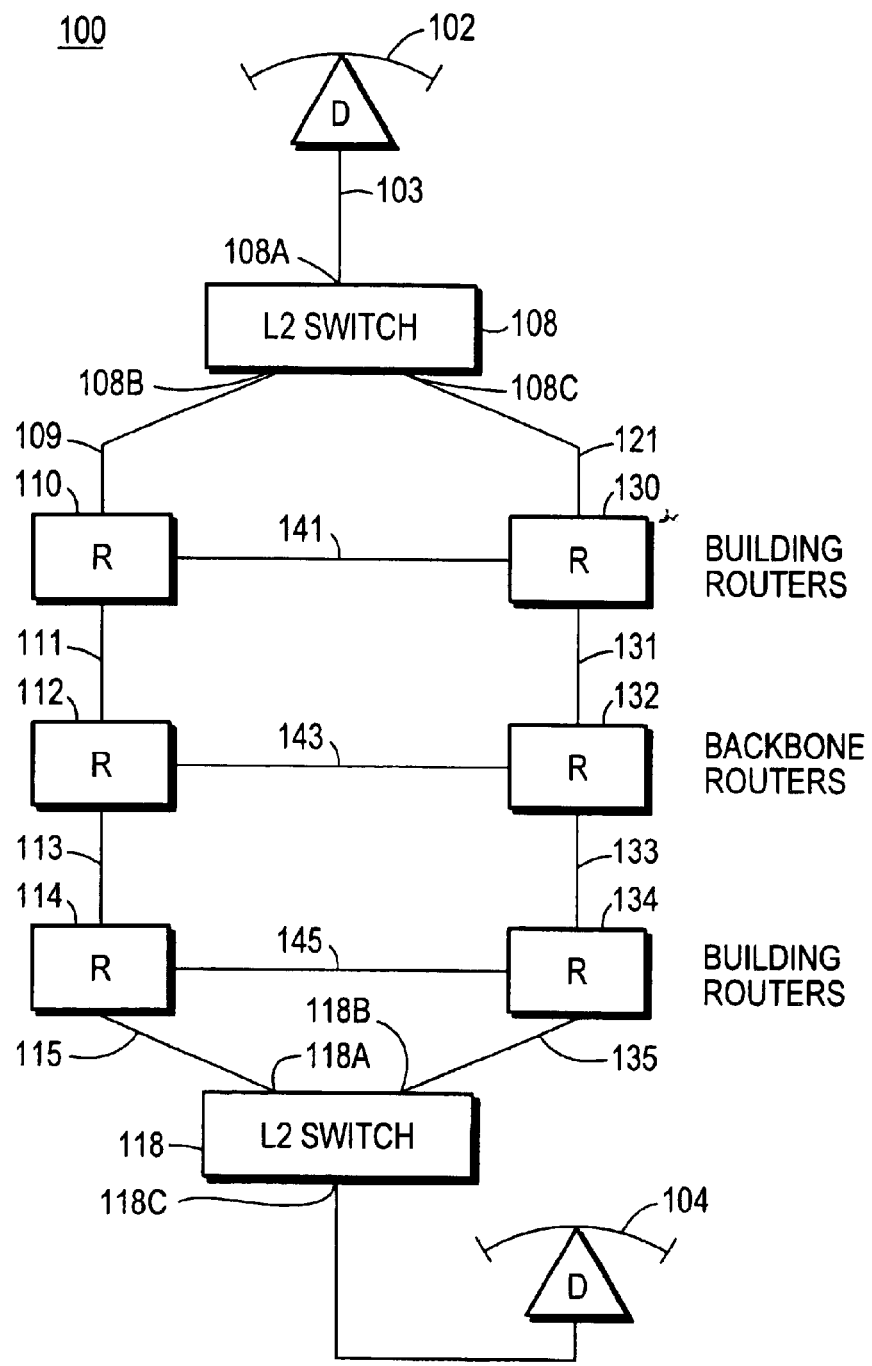
FIG. 1A is a block diagram of a computer network for use with a digital telephone, in accordance with the invention.

Turning now to FIG. 1A, computer network 100 is shown. Computer network 100 is arranged for transmission of voice traffic from digital telephone 102 to digital telephone 104. The letter "D" in the drawing indicates that the telephone is a digital telephone. A person speaking on digital telephone 102 sends data packets, for example Ethernet packets, along computer network connection 103 to network device 108.

Figure 1B:
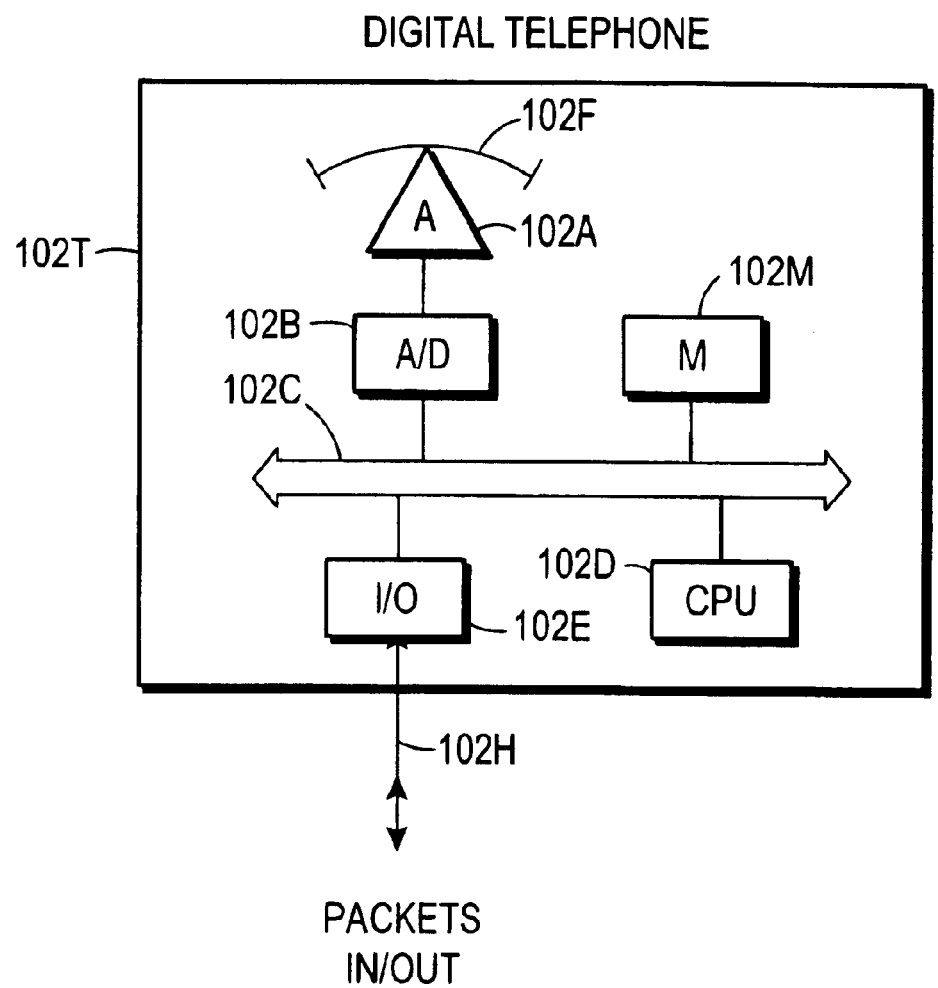
FIG. 1B is a block diagram of a digital telephone in accordance with the invention.

Turning now to FIG. 1B, digital telephone 102T is shown. Digital telephone 102T has an analog telephone 102A coupled to analog to digital converter (A/D) 102B. The analog nature of analog telephone 102A is shown by the letter "A" in the drawing. In turn, A/D converter 102B is coupled to microprocessor bus 102C. Also coupled to microprocessor bus 102C are microprocessor central processor unit (CPU) 102D; memory unit 102M; and, input output unit (I/O unit) 102E.

In operation, when digital telephone 102T serves a transmitting role, a person speaking into handset 102F generates an analog signal which is digitized by A/D converter 102B. The digitized signal is transferred to microprocessor bus 102C and is packed into a data packet suitable for transmission on a computer network by inter-operation of CPU 102D, programs and data stored in memory unit 102M, and by I/O unit 102E. A packet is transmitted onto a computer network connection 102H, for example an Ethernet packet. The computer network packet transmitted onto computer network connection 102H is written with a specially assigned MAC (layer 2) destination address, as will be further described hereinbelow.

In the event that digital telephone 102T serves as a receiving telephone, computer data packets are received on computer network connection 102H by I/O unit 102E. The received computer packets are processed by interoperation of CPU 102D, programs and data stored in memory unit 102M, and A/D converter 102B to produce an analog signal delivered to analog telephone 102A by A/D unit 102B. A person using handset 102F then hears an audible signal produced by analog telephone 102F creating sound waves in the air in response to the analog signal delivered to it by A/D converter 102B. Accordingly, computer data packets containing voice data arriving at computer network connection 102H produce an audible signal for a person using analog telephone 102A to hear.

In a preferred embodiment of the invention, data packets containing digitized voice information transmitted by digital telephone 102T through computer network connection 102H to a receiving digital telephone are Ethernet data packets.

The A/D converter 102B generates a particular encoding of voice, for example G.729 or G.711. The microprocessor puts the information into RTP-UDP-IP-MAC frames and queues them for transmission on the Ethernet connection through I/O unit 102E to switch 108, as described more fully herein-below.

Returning to a discussion of FIG. 1, computer network packets suitable for transmission on a computer network travel from digital telephone 102 to L2 switch 108. The packets have as their MAC destination address the "special multicast address". L2 switch 108 is commonly referred to as a "wiring closet" switch, as computer networks installed in a building often use an L2 switch as a first switching device in the network. In response to the "special multicast" MAC DA of the packet, L2 switch 108 replicates the packet received on port 108A and transmits it out through both port 108B and port 108C.

The packet received on port 108A carries a "sequence number" in the RTP header, as described with reference to FIGS. 4A–4D. When L2 switch 108 replicates the packet, the replicated packets are identical in all levels, from MAC up, and therefore the RTP sequence numbers are identical in the replica packets.

The packet transmitted through port 108B is received by router 110. Router 110 makes a routing decision and transmits the packet through a port to router 112. Router 112 makes a routing decision and transmits the packet to router 114. Router 114 makes a routing decision and transmits the packet to L2 switch 118. L2 switch 118 receives the packet at its port 118A. L2 switch 118 is also a "wiring closet" switch, and is either in the same building or a different building from wiring closet switch 108. The packet received by L2 switch 118 is then transmitted through a port to digital telephone 104. Digital telephone 104 converts the received computer network packet into an analog signal, and finally into audible sound waves, as described with reference to FIG. 1B, and a person using the digital telephone 104 hears the sounds. In this way, a speaker using digital telephone 102 can be heard by a listener using digital telephone 104.

Returning now to the action of L2 Switch 108, the packet transmitted through port 108C is received by router 130. Router 130 makes a routing decision and transmits the packet through a port to router 132. Router 132 makes a routing decision and transmits the packet through a port to router 134. Router 134 makes a routing decision and transmits the packet to L2 switch 118. L2 switch 118 receives the packet at its port 118B.

The first packet to be received by L2 Switch 118 with the same sequence number is utilized in conversion to analog audio, and the second and any subsequent packets received with the same sequence number are discarded. The second and subsequent packets with a particular sequence number may be discarded by L2 switch 108. Alternatively, the switch may simply forward all packets, and the receiving digital telephone 104 may keep track of the packet sequence numbers and discard any second or subsequent packets with a sequence number already received by the digital telephone.

Routing decisions in routers 110, 112, 114, 130, 132, 134 are next described. Typically, as described herein below, routers 110 and 130 are in a building containing the wiring closet L2 switch 108. Also, routers 114 and 134 are contained in a building containing wiring closet switch L2 switch 118. Accordingly, router 110, 130 and routers 114 and 134 are referred to as "building routers". Routers 112 and 132 are referred to as "backbone routers", as in a typical installation these routers connect the computer networks of various buildings together into a more complete network, as described in greater detail herein below.

Routers normally make their routing decision based upon Link State Packet Routing (LSP Routing). In LSP Routing, a network manager assigns costs to various links. Accordingly, costs are assigned to links of the computer network 100 of FIG. 1, so as to encourage the routers to develop routing pathways using standard LSP Routing to transfer the packets transmitted at ports 108B and 108C so that the packets take different pathways from L2 switch 108 to L2 switch 118. Assignment of costs to the various links may, for example, be done as follows. Link 109, between port 108B and router 110, link 111 between router 110 and router 112, link 113 between router 112 and router 114, and link 115 between router 114 and L2 switch 118 may all be assigned low costs, for example, a cost of 10. Similarly, link 121 between port 108C and 130, link 131 between router 130 and router 132, link 133 between router 132 and router 134, and link 135 between router 134 and L2 switch 118 may also be assigned low costs, for example, a cost of 10. Further, links connecting the various routers are assigned high costs. For example, link 141 between router 110 and router 130, link 143 between router 112 and router 132, and link 145 between router 114 and router 134, may each be assigned high costs, for example, costs of 1,000 may be assigned to these links.

With an assignment of costs as described, normal Link State Packet Routing causes the routers 110, 112, and 114, to transfer the packet received from L2 switch port 108B along links 109, 111, 113, 115 and to L2 switch 118. Also, this assignment of costs causes routers 130, router 132, and router 134 to transfer a packet from port 108C of L2 switch 108 along links 121, 131, 133, and 135 to L2 switch 118.

The routers do not transfer the packets through links 141, 143 or 145 because of the high costs assigned to these links. Accordingly, under normal operation of LSP Routing, the pairs of identical packets transmitted by L2 switch 108 on its 2 ports 108B and 108C do not converge until they reach the receiving wiring closet switch, L2 switch 118.

In the event that a link such as link 131 should become inoperative, then the router 130 will respond by recalculating its Link State Packet Route and transfer packets through link 141. That is, the routers will transfer packets along the high cost links only in the event that an interruption in service along a low cost link occurs.

Referring now to L2 switch 118 in the event a fault occurs along one of the pathways, for example, in the event that link 131 becomes inoperative, then packets travelling from port 108C of L2 switch 108 will fail to reach L2 switch 118. However, packets following along the other pathway, links 109, 111, 113, 115 will reach L2 switch 118 without problem or delay. Accordingly, a telephone conversation between digital telephone 102 and digital telephone 104 will not be interrupted by the development of a fault in link 131. In the event that a fault occurs in link 131 or 133 or in one of the routers 132, 134, etc. then router 130 recomputes its route under Link State Packet Routing, and begins transmitting its packet along link 141 to router 10. Router 110 will then make a routing decision and transfer the packet along link 111 to router 112, etc. Accordingly, then L2 switch 118 will receive two identical packets for each data packet generated by digital telephone 102, with both packets received at port 118A. The receipt of these two identical data packets causes no problem as the first data packet received with a specific sequence number will be converted to audio by digital telephone 104, and the second packet with the same sequence number will be discarded. Either the 12 switch 118 or the digital telephone 104 may keep track of the sequence numbers and use the first packet with a sequence number to generate audio, and discard all subsequent packets with the same sequence number.

Figure 2:
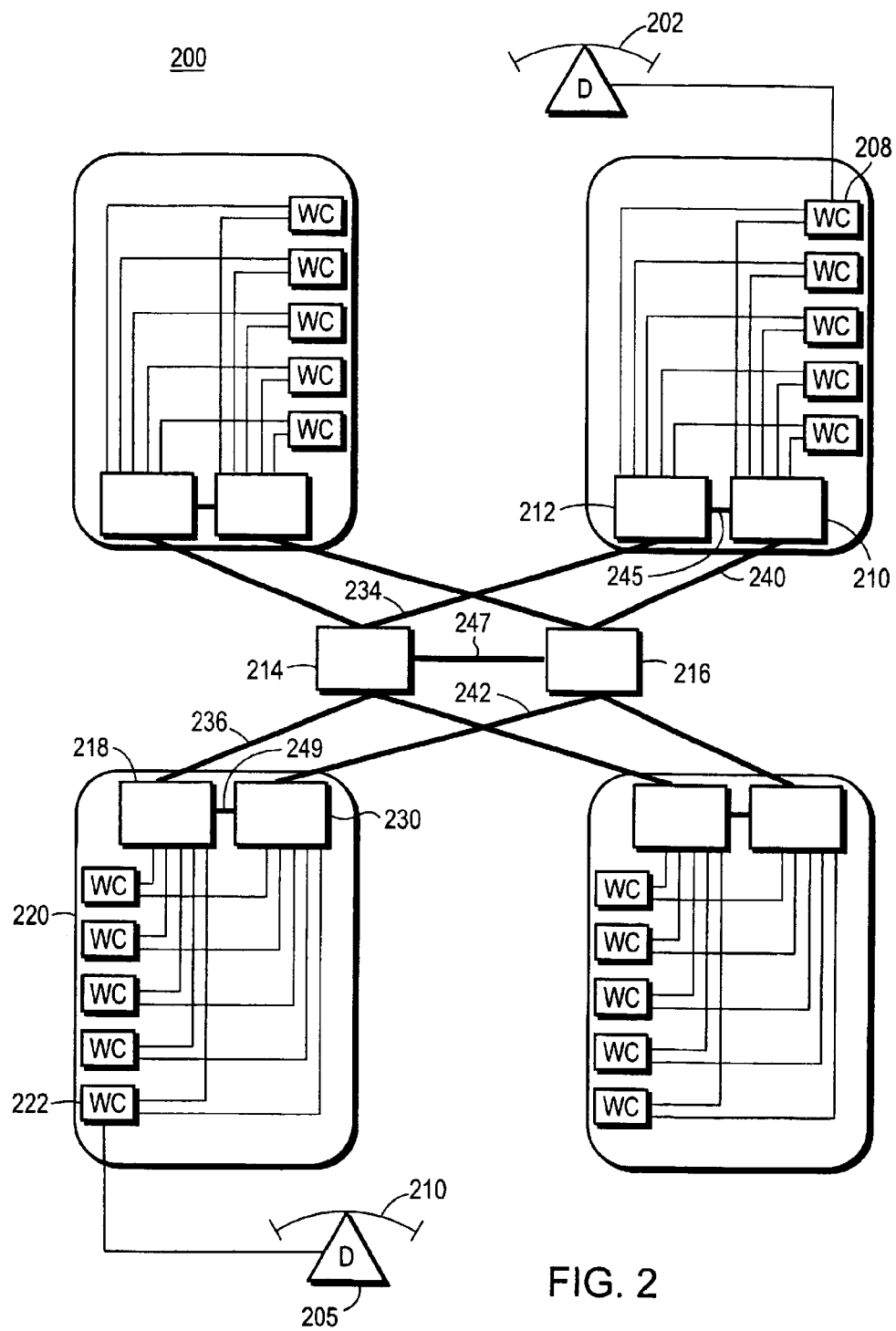
FIG. 2 is a block diagram of a computer network showing a few interconnected buildings in accordance with the invention.

Turning now to FIG. 2, computer network 200 is shown. Computer network 200 interconnects a plurality of buildings 201A, 201B, 201C, 201D, etc. For example, computer network 200 supports a telephone conversation between digital telephone 202 and digital telephone 205. Digital telephone 202 transfers digitized voice packets to wiring closet Layer 2 switch 208. Wiring closet switch 208 connects to two separate building routers, router 210 and router 212, where router 210 is analogous to router 130 of FIG. 1A, and router 212 is analogous to router 110 of FIG. 1A. Router 212 connects to backbone router 214, and building router 210 connects to backbone router 216. Backbone router 214 connects to building router 218 of building 220, and building router 218 connects to wiring closet Layer 2 switch 222. Wiring closet switch 222 transfers the data packet to digital telephone 205.

Similarly, an identical packet is transmitted by wiring closet Layer 2 switch 208 to building router 210, and the packet is transferred from building router 210 to backbone router 216, and backbone router 216 transfers the packet to building router 230, where building router 230 is in building 220. The packet is transferred from building router 230 to wiring closet Layer 2 switch 222, where the packet may be transferred digital telephone 205. The first packet arriving with a particular sequence number is converted into audio by the digital telephone, and all subsequent packets with that sequence number are discarded.

Again, costs are assigned to various links so that routers 212, 214, 218 transfer the packet received by router 212 along link 234 and link 236 to to building 220, and thence to wiring closet switch 222. Also, the assignment of costs causes router 210 to transfer the packet which it receives from wiring closet switch 208 along link 240 to router 216, and router 216 transfers the packet along link 242 to building router 230, which then transfers the packet to wiring closet switch 222.

The packets travelling along the route from router 212, router 214, router 218 do not converge with the path of the packets travelling along the pathway from router 210, router 216, and router 230. An assignment of costs to cause the standard Link State Packet Routing to achieve independent routes which do not converge, may, for example, be assigned as follows. Link 234 between router 212 and router 214, and link 236 between router 214 and router 218 are assigned a low cost, for example, a cost of 10. Similarly, link 240 between router 210 and router 216, and link 242 between router 216 and router 230 are assigned a low cost, for example, a cost of 10. Further, link 245 between router 212 and router 210, link 247 between router 214 and router 216, and link 249 between router 218 and router 230, are assigned a high cost, for example, a cost of 1,000. Normal Link State Packet Routing causes router 212 to develop a route through router 214 and router 218, because of the cost assignments. Also, the cost assignments cause router 210 to develop a path through 216 and router 230. Thus, the identical packets generated by wiring closet switch 208 do not converge until they reach the wiring closet switch 222 attached to destination digital telephone 205.

Figure 3:
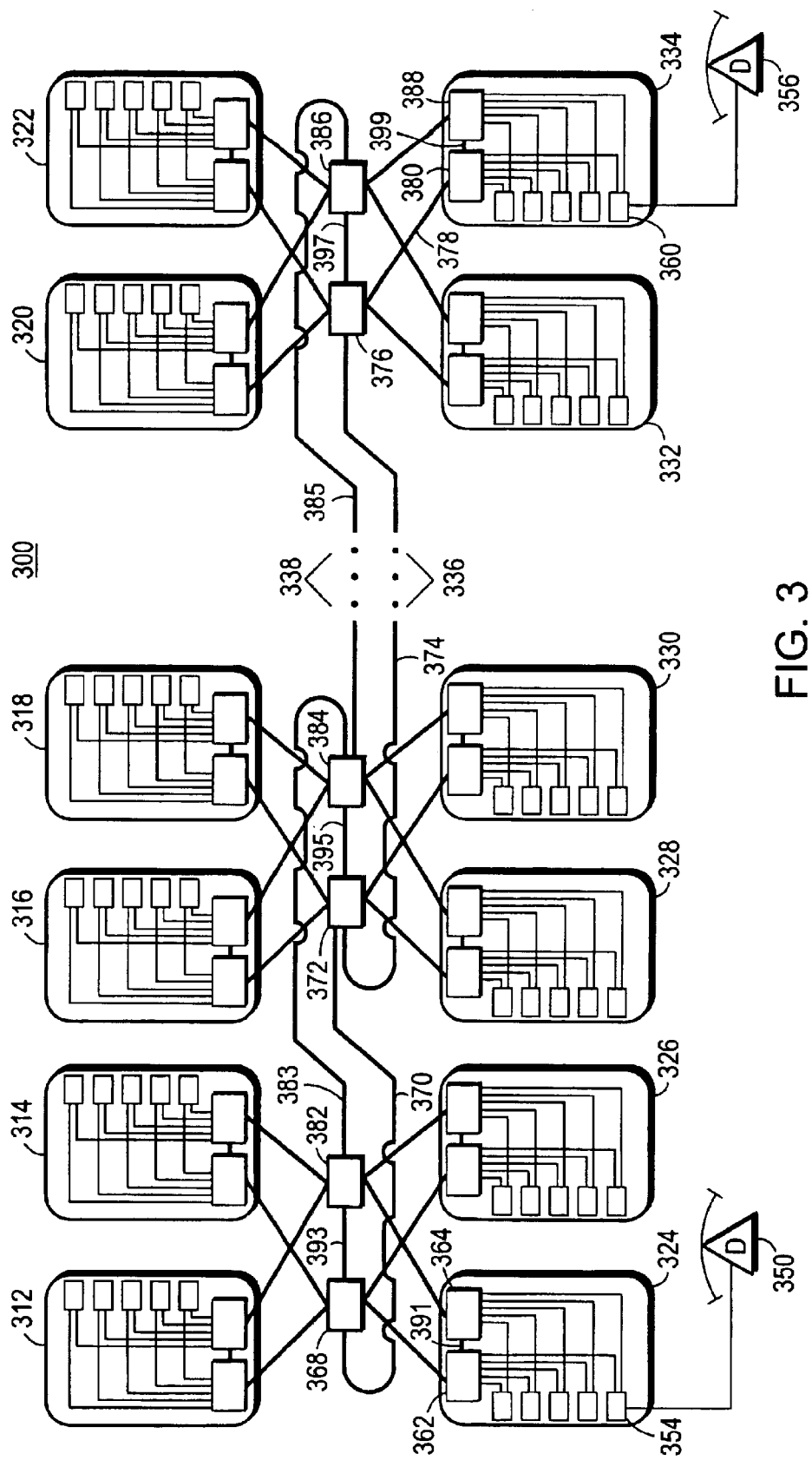
FIG. 3 is a block diagram of a computer network showing a plurality of buildings interconnected in accordance with the invention.

Turning now to FIG. 3, computer network 300 is shown. Computer network 300 connects digital telephones in a plurality of buildings, for example, building 312, building 314, building 316, building 318, building 320, building 322, building 324, building 326, building 328, building 330, building 332, and building 334, etc. Three dots 336 and 338 indicate that an arbitrarily large number of buildings may be interconnected in computer network 300.

Computer network 300 has two (2) pathways, as shown in FIG. 1 and FIG. 2, for a telephone conversation between any two digital telephones in any of the buildings. In an alternative embodiment of the invention, three or more paths between buildings may be used in order to increase reliability in voice communications. Only two non-converging paths are shown in FIG. 3 in order to keep the drawing simple. The three or more paths are maintained non-converging until the receiving wiring closet network device by assignment of costs, in the LSP protocol sense, to links of the network.

For example, digital telephone 350 connects to the network through wiring closet switch 354. Also, receiving digital telephone 356 connects to the network through wiring closet switch 360. In the event that a telephone conversation originates from digital telephone 350 a digitized audio packet is transmitted to wiring closet switch 354. Wiring closet switch 354 replicates the packet and transmits identical copies to building routers 362, 364. Building router 362 transmits the packet which it receives to backbone router 368, and backbone router 368 transmits the packet through low cost link 370 to backbone router 372. Backbone router 372 transmits the packet through low cost link 374 to backbone router 376. Backbone router 376 transfers the packet through low cost link 378. Building router 380 receives the packet through low cost link 378 and transfers the packet to wiring closet switch 360. Wiring closed switch 360 transfers the packet to receiving digital telephone 356.

Also, the packet transmitted by wiring closet switch 354 to building router 364 is transferred to backbone router 382. Backbone router 382 transfers the packet along low cost link 383 to backbone router 384. Backbone router 384 transfers the packet through low cost link 385 to backbone router 386. Backbone router 386 transfers the packet to building router 388. Building router 388 then transfers the packet to wiring closet switch 360. Wiring closet switch 360 transfers the packet to digital telephone 356. The first packet with a particular sequence number to reach wiring closet switch 360 (or, for example, digital telephone 356) is translated into analog audio by digital telephone 356. Subsequently received packets with the same sequence number are simply discarded.

High cost links connect various routers of computer network 300, so that the routers will generate a route under ordinary Link State Packet Routing as described above. The high cost links will then be used by the network in the event that one of the low cost pathways becomes inoperative. The high cost links which serve for use in the event of a fault are, for example, link 391, link 393, link 395, link 397, and link 399. For example, low costs, for instance, a cost of 10, may be assigned to links 370, 383, 374, 385, etc., and high costs, for example, a cost of 1,000, may be assigned to links 391, 393, 395, 397, 399, etc. The high cost links will be utilized through ordinary Link State Packet Routing in the event that a fault prevents flow of packets along the low cost links.

Figure 4:
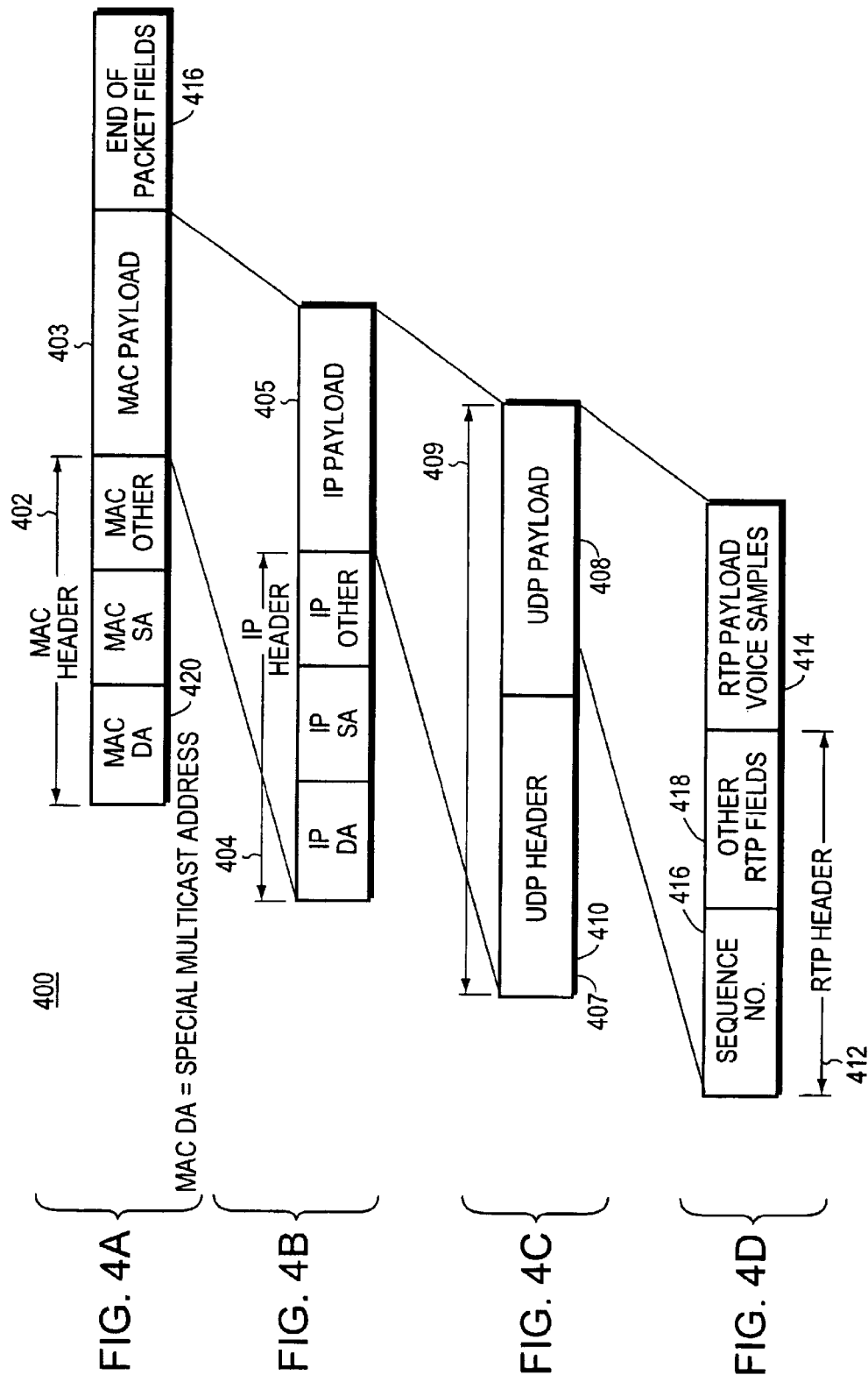
FIG. 4A is a field diagram of a MAC layer frame.
FIG. 4B is a field diagram of an IP layer frame.
FIG. 4C is a field diagram of a UDP frame.
FIG. 4D is a field diagram of a RTP frame.

Turning now to FIG. 4A, a typical data voice packet 400 is shown. Data voice packet 400 is shown as a MAC layer packet. Data voice packet 400 is a form of voice packet which, for example, may be used in the practice of the invention. Illustrative data voice packet 400 basic structure is taken from the Real Time Protocol (RTP) as described in RFC 1889, all disclosures of which are incorporated herein be reference. An RFC is a request for comments published by the Internet Engineering Task Force (IETF). RFC documents are published on the IETF web page at the URL: http:\\www.ietf.org.

Voice packet 400 is transmitted by I/O unit 102E, for example, to L2 switch 108. Switch 108 then replicates voice packet 400 and transmits it out through multiple ports to the multiple non-converging paths of the invention.

Voice packet 400 has MAC Layer 2 header 402 and MAC payload field 403, and end of packet fields 416. The end of packet fields 416 are the standard fields for the protocol utilized by the computer network. MAC payload field 403 contains layer 3 IP fields shown in FIG. 4B.

The Layer 3 fields shown in FIG. 4B contain IP header 404 and IP payload field 405. The IP header 404 contains the layer 3 destination address IP DA, the IP source address IP SA, and other layer 3 fields indicated as "IP other". The IP payload field contains the User Datagram Protocol (UDP) fields shown in FIG. 4C.

The UDP fields 406 contain the UDP header 407 and the UDP payload field 408. The UDP payload field contains the RTP packet fields as shown in FIG. 4D.

The RTP packet fields shown in FIG. 4D contain the RTP header fields 412, and the RTP payload voice samples 414. The RTP header fields shown in FIG. 4D contain the sequence number field 416 and other RTP header fields 418. The voice samples being transported from the source digital telephone to the destination digital telephone are carried in RTP payload voice samples field 414.

The Layer 2 MAC destination address field 420 contains a special multicast address. A multicast address is used in the MAC Layer 2 DA field so that L2 switch 108 uses its multicast capability to replicate the data packet received from digital telephone 102. A "special" multicast address is assigned for practice of the invention so that L2 switch 108 transmits replicated voice packets on assigned ports only, and not all of its ports. For example, as shown in FIG. 1, replicated packets are transmitted on only two ports, port 108B and port 108C.

In an alternative embodiment of the invention, a wiring closet device, either a switch or router, may transmit identical copies of the voice packet out through three or more ports in order to increase the redundancy of the non-converging paths in order to improve reliability of the communication session. That is, rather than using only two parallel non converging paths in order to improve reliability of voice packet transmission across the computer network, three or more non-converging pathways may be utilized. For example, L2 switch 108 could transmit replicated packets on three or more ports, the ports could each have separate router pathways to prevent convergence of the pathways before the receiving wiring closet switch. The desired pathways to the destination wiring closet switches are assigned low costs in a LSP Routing sense. LSP Routing then chooses the non-converging low cost pathways for ordinary routing. Interconnecting links between routers are assigned high costs so that the interconnecting pathways are selected by LSP Routing algorithms only when a low cost path has been interrupted.

Figure 5:
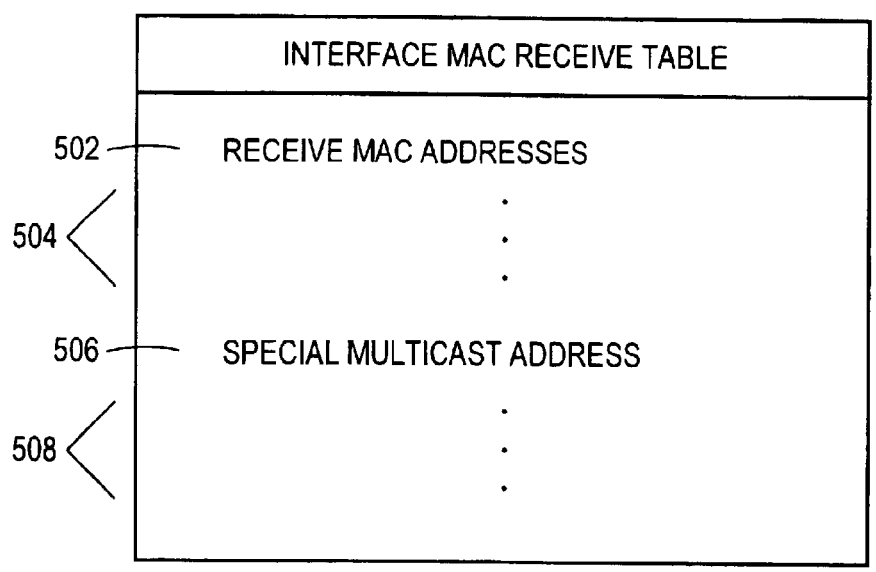
FIG. 5 is an Interface MAC Receive Table for receiving packets, in accordance with the invention; and, FIG. 6 is a block diagram of hardware which can serve as a Layer 2 switch or as a Layer 3 router.

Also, the special multicast address for the reliable audio communication is added to the layer 2 switch or the router Layer 2 table "for receipt of data packets", that is the "Interface MAC Receive Table" as shown in FIG. 5. A router normally receives only those data packets whose destination address is included in a Layer 2 table in an interface of the router, where that table instructs the router to receive the packet. Packets with a different MAC Layer destination address are ignored by the router. The special multicast address of the invention is placed in the "Interface MAC Receive Table" as shown, for example, in FIG. 5.

Sequence number 416 is utilized by a receiving wiring closet switch and/or digital telephone in order to trigger conversion of the first received packet into audio for reproduction by the digital telephone, and to discard the second or any subsequent packets with that same sequence number. For example, the wiring closet switch may simply forward all packets to the digital telephone, and the digital telephone keeps track of the sequence numbers and reproduces only the first received packet with a sequence number.

Alternatively, the wiring closet switch may keep track of the sequence numbers, and forward only the first received packet with a particular sequence number to the digital telephone.

Also the wiring closet device may be either a Layer 2 switch as described hereinabove, or may alternatively be a Layer 3 device such as a router, or may be any be any other convenient packet forwarding device.

Turning now to FIG. 5, a Table, referred to as "Interface MAC Receive Table" 500 is shown. Interface MAC Receive Table 500 is used by an interface at layer 2 in order to select packets with desired MAC addresses, in accordance with the invention. The layer 2 switch or the router receives packets having a Layer 2 MAC destination address found in Interface MAC Receive Table 500. Layer 2 Table 500 has entries 502, 504 indicated by three dots, the special multicast address 506, and additional entries indicated by three dots 508. Accordingly, the special multicast address 506 for use with the invention is added to Interface MAC Receive Table 500 for all of the wiring closet switches receiving voice packets from digital telephones.

An alternative embodiment of the invention may use layer 3 routers as wiring closet devices 108, 118, 210, 222, 354, 360, etc. In this alternative embodiment of the invention, the layer 2 table of the router is modified as shown in "Interface MAC Receive Table" 500 to contain an entry for the Special Multicast Address 506. In response to receiving a packet having the Special Multicast Address in its MAC DA field, the network device, layer 3 router in this case, replicates the packet and transmits it out through designated ports as described hereinabove with reference to FIG. 1, FIG. 2, FIG. 3, etc. Also the network device, when receiving a RTP packet routes the packets to the digital telephone. Again, either the network device or the digital telephone may filter for the first packet with a particular sequence number, and only the first received packet is converted into audio sound waves heard by the user of the digital telephone.

In a preferred embodiment of the invention, a digital telephone is connected to a Layer 2 switch in a wiring closet of a building, the "initiating switch". The packet travelling from the digital telephone to the initiating switch in the wiring closet uses a "specially assigned" multicast MAC destination address written into entry 506. The specially assigned MAC address is added to all interfaces of the initiating switch that need to receive a packet from a digital telephone. The switch is configured to receive and replicate the packets having the specially assigned MAC address as their MAC DA, for example, the switch is so configured when it executes its initialization routines. The initiating switch replicates the packet using its ordinary multicast process and, responding to the "specially assigned" value, transmits identical packets onto two assigned ports.

Figure 6:
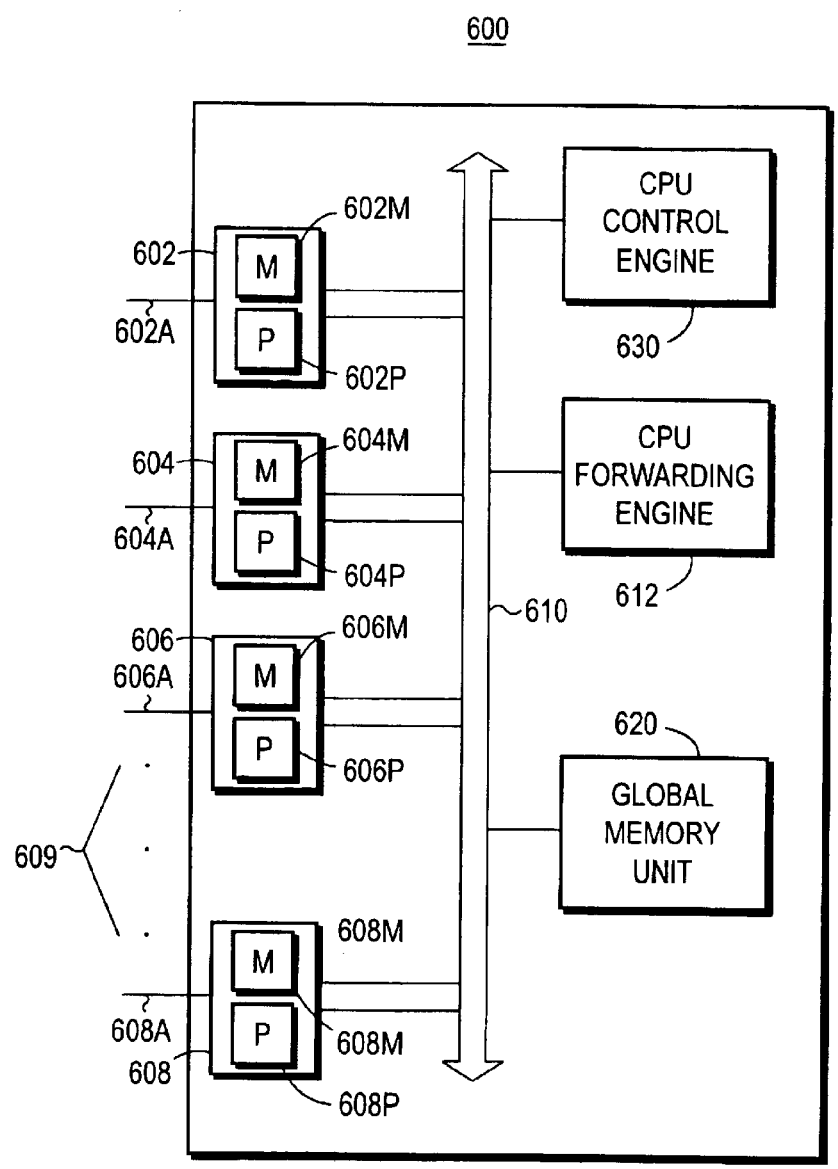

Turning now to FIG. 6, block diagram 600 of a representative hardware structure for internal operation of a Layer 2 switch or Layer 3 router is shown. Each linecard 602, 604, . . . 608 supports a port. For example, linecard 602 has port 602A; linecard 604 has port 604A; linecard 606 has port 606A, . . . and linecard 608 has port 608A, etc. Each linecard has a memory unit. For example, linecard 602 has memory unit 602M, linecard 604 has memory unit 604M, linecard 606 has memory unit 606M . . . and linecard 608 has memory unit 608M, etc. Each line card has a processor P, indicated by blocks 602P, 604P, 606P, . . . 608P, etc. The various linecards are interconnected by switch fabric 610. Switch fabric 610 may be, for example, a crossbar type switch fabric, an ATM based switch fabric, or may be simply a computer bus. A central processor unit forwarding engine 612 also attaches to switch fabric 610. In operation, a packet arrives at a port of a linecard and is transferred by switch fabric 610 to memory units in the required linecards.

Further, CPU control engine 630 attaches to switch fabric 610. CPU control engine 630 is used to execute various control protocols for the network device. For example, CPU control engine 630 may be used to execute the Spanning Tree Protocol, the Link State Routing Protocol, the OSPF protocol, the IGRP protocol, the EIGRP protocol, etc. Data read from various fields of a received packets are transferred to CPU control engine 630. Then CPU control engine exercises control of the network device through switch fabric 610, through control lines not shown in FIG. 6, etc.

For example, in the event that a packet is received from an external connection at port 602A, the packet arrives at port 602A, is stored in memory unit 602M, and is simultaneously transmitted on switch fabric 610 to all of the other linecards, where the packet is stored in the memory unit of each of the other linecards. The memory 602M in the receiving linecard is necessary as a buffer in the event that switch fabric 610 is busy at the time that the packet arrives at port 602A. Processors 602P, 604P, 606P, . . . 608P, etc. on each linecard receive information from circuits on the linecard interpreting fields of the packets as the packet is being received.

In an exemplary embodiment of the invention, processors 602P, 604P, 606P, . . . 608P, etc. on the individual linecards act as forwarding engines and make decisions concerning the ports through which the packet is to be transmitted.

In an alternative exemplary embodiment of a Layer 2 switch or Layer 3 router, as the packet is being transferred on switch fabric 610 to all of the other linecards, fields of the packet are interpreted by circuitry in the receiving linecard, information is transferred to CPU forwarding engine 612, and CPU 612 makes decisions concerning which ports the packet is to be transmitted out through. Once CPU 612 makes a decision as to which ports the packet should be forwarded through, CPU 612 asserts control lines (not shown in FIG. 6) which grant permission to the appropriate linecards to transmit the packet out through that linecard's port.

In an exemplary embodiment of the invention, hardware 600 may represent a Layer 2 wiring closet switch such as wiring closet switches 108, 118, etc. For example, in a wiring closet switch operating by making forwarding decisions by reading Layer 2 fields, the linecards may read the fields as the packet is being received. Then, based upon the "special multicast" address of the invention being found in the MAC DA field 420, the packet is held in line card memory while the forwarding engine CPU 612 makes a decision.

In accordance with the invention, a processor provided by the Layer 2 switch or Layer 3 router, such as for example linecard processors 602P, 604P, . . . 608P, etc., or for example the forwarding engine CPU 612, decide that this particular multicast address in a packet arriving on the input port must be replicated and transmitted out through the assigned ports for that particular multicast address. That is, in this exemplary embodiment of the invention, a wiring closet switch such as Layer 2 switch 108 decides to transmit a packet received on port 108A out through port 108B and port 108C.

As a further example, the hardware 600 may represent a Layer 3 router such as building routers 110, 120, 114, 134, or backbone routers 112, 132, etc. In this exemplary embodiment of the hardware 600, the line cards read the Layer 3 fields 404. When a routing decision is required, the linecard processors or the CPU forwarding engine 612 selects the least cost route, depending upon, for example link state packet routing (LSP routing). Also, when a link becomes inoperative, the CPU learns this fact and initiates a new round of link state packet routing calculations in order to change its routing pathways to the various other routers in the network.

In an alternative embodiment of the invention, a linecard may support a plurality of ports rather than only one port as is shown in FIG. 6. Three dots 609 indicate that a large number of linecards may be supported by the Layer 2 switch or Layer 3 router.

The exemplary internal architecture of a typical Layer 2 switch or Layer 3 router as shown in block diagram 600 permits line speed transfer of an incoming packet to one or more outgoing ports, simultaneously with receipt of the packet. Only a small delay is encountered, depending upon factors, for example, the state of switch fabric 610 as the packet is received at its incoming port, and the delay imposed by ordinary switch fabric transfer processes along switch fabric 610.

In an alternative exemplary design of a Layer 2 switch or Layer 3 router, a linecard may transfer an incoming packet to global memory unit 620. CPU 612 reads fields of the packet and decides which linecards must transmit the packet. After the packet is received into global memory 620, the packet is read by each linecard which must transmit the packet, and then the packet is transmitted by the linecards. In either event, the hardware reads the fields of the appropriate Layer, and responds by making the appropriate decision.

It is to be understood that the above-described embodiments are simply illustrative of the principles of the invention, and various other modifications and changes may be made by those skilled in the art which embody the principles of the invention and fall within the spirit and scope thereof.

What is claimed is:

1. A computer network having improved reliability in data transmissions, comprising:
   an interpreter in a switch for interpreting a special multicast address in a packet received by said switch, said switch in response to receipt of a packet having said special multicast address, replicating said packet by transmitting identical copies of said packet on a plurality of ports of said switch;
   a first router for receiving a first copy of said packet having said special multicast address transmitted from a first port of said plurality of ports of said switch, and a second router for receiving a second copy of said packet having said special multicast address, said second packet transmitted by a second port of said plurality of ports of said switch;
   a first plurality of subsequent routers connected to said first router along an intended path for said first copy of said packet, said intended path having a plurality of links, and said links assigned a low cost in a Link State Packet Routing sense; and a second plurality of routers connected to said second router along an intended path for said second copy of said packet, said intended path having a plurality of links, and said links assigned a low cost in a Link State Packet Routing sense, said first plurality of routers connected to said second plurality of routers by links having assigned high costs in a Link State Packet Routing sense.

2. A network device for forwarding voice packets on a computer network, comprising:

an input port for receiving said voice packet;

a plurality of output ports assigned for transmitting said voice packet out of said network device in the event that a received packet carries a special multicast address in a layer 2 destination address field of said received packet; and a circuit to read said layer 2 destination address field of said received packet, and in the event that said special multicast address is found in said layer 2 destination address field of said received packet, to interpret said special multicast address as indicating that said received packet is said voice packet, and to transfer said voice packet to said plurality of output ports for transmission of replica packets of said voice packets through different paths in said computer network, said paths having a low cost, in a Link State Protocol (LSP) sense, said paths also having a high cost to links that would connect each of said different paths to each other, said high cost effectively maintaining a non-converging separateness between said different paths.

3. The apparatus of claim 2, further comprising: said network device is a layer 2 switch.

4. The apparatus of claim 2, further comprising: said network device is a router.

5. A method of improving reliability in data communications over a computer network, comprising:

receiving a voice data packet by a network device, replicating said voice data packet, and transmitting replica packets onto a first link and a second link;

assigning low cost to links, including said first link, in a first desired path through said computer network, said cost used by Link State Packet Routing protocol (LSP protocol) to select a route through said network;

assigning low cost to links, including said second link, in a second desired path, through said computer network; and assigning high costs to links between said first desired path and said second desired path, so that in response to assigning low costs to links in said first and second desired paths, LSP protocol selects said first and second desired paths for transmitting said replica packets through said network, respectively, and in response to high costs assigned to said links between said first and second desired paths, LSP does not select links that would create a convergence of said first and second desired paths.

6. The method of claim 5 wherein LSP routing selects links that would create a convergence of said first and second desired paths upon failure of a link in either said first and second desired paths.

7. A method of improving reliability in data communications over a computer network, comprising:

receiving a voice data packet by a network device, replicating said voice data packet, and transmitting replica packets onto a first link and a second link;

assigning low cost to links, including said first link, in a first desired path through said computer network, said cost used by Link State Packet Routing protocol (LSP protocol) to select a route through said network;

assigning low cost to links, including said second link, in a second desired path through said computer network;

assigning high costs to links between said first desired path and said second desired path, so that in response to assigning low costs to links in said first and second desired paths, LSP protocol selects said first and second desired paths for transmitting said replica packets through said network, respectively, and in response to high costs assigned to said links between said first and second desired paths, LSP does not select links that would create a convergence of said first and second desired paths;

transmitting a voice data packet by a first digital telephone to a first network device;

transmitting, by said first network device, a replica packet of said voice data packet onto said first link for transmission through said first desired path through said computer network to a second network device;

transmitting, by said first network device, a replica packet of said voice data packet onto said second link for transmission through said second desired path through said computer network to said second network device; and converting by a second digital telephone a first replica packet of said voice data packet received by said second network device into audible sound, and discarding any subsequently received replica packets of said voice data packet.

8. The method of claim 7 further comprising: selecting said first replica packet of said voice data packet by said second network device.

9. The method of claim 7 further comprising: selecting said first replica packet of said voice data packet by said second digital telephone.

10. The method of claim 7 further comprising: selecting said first network device to be a layer 2 switch.

11. The method of claim 7 further comprising: selecting said first network device to be a router.

12. The method of claim 7 further comprising:

writing a sequence number into said voice data packet by said first digital telephone;

writing said sequence number into each said replica packet; and using said sequence number to determine the first received replica of said voice data packet by said second network device.

13. A computer readable device having instructions written thereon for practicing a method of, receiving a voice data packet by a network device, replicating said voice data packet, and transmitting replica packets onto a first link and a second link;

assigning low cost to links, including said first link, in a first desired path through said computer network, said cost used by Link State Packet Routing protocol (LSP protocol) to select a route through said network;

assigning low cost to links, including said second link, in a second desired path through said computer network; and assigning high costs to links between said first desired path and said second desired path, so that in response to assigning low costs to links in said first and second desired paths, LSP protocol selects said first and second desired paths for transmitting said replica packets through said network, respectively and in response to high costs assigned to said links between said first and second desired paths, LSP does not select links that would create a convergence of said first and second desired paths.

14. Electromagnetic signals travelling on a computer network, said electromagnetic signals carrying instructions for execution on a processor for practicing a method of, receiving a voice data packet by a network device, replicating said voice data packet, and transmitting replica packets onto a first link and a second link;

assigning low cost to links, including said first link, in a first desired path through said computer network, said cost used by Link State Packet Routing protocol (LSP protocol) to select a route through said network;

assigning low cost to links, including said second link, in a second desired path through said computer network; and assigning high costs to links between said first desired path and said second desired path, so that in response to assigning low costs to links in said first and second desired paths, LSP protocol selects said first and second desired paths for transmitting said replica packets through said network, respectively, and in response to high costs assigned to said links between said first and second desired paths, LSP does not select links that would create a convergence of said first and second desired paths.

15. A method for use with transmitting a packet from a source to a destination, said method comprising the steps of:

assigning a low cost, in a Link State Packet (LSP) routing sense, to links on two or more packet paths from said source to said destination; and assigning a high cost, in an LSP routing sense, to links that would connect each of said two or more packet paths to each other, said high cost effectively maintaining a non-converging separateness between said two or more packet paths.

16. The method as in claim 15, further comprising the steps of:

assigning a unique sequence number to said packet;

replicating said packet into two or more packets, each of said two or more packets carrying the same unique sequence number;

transmitting said two or more packets over said low cost two or more packet paths, respectively;

accepting, at said destination, a first of said two or more packets to arrive at said destination; and discarding, at said destination, any of said two or more packets to arrive at said destination after said first packet.

17. The method as in claim 16, wherein said steps of replicating and transmitting are performed on a network device.

18. The method as in claim 17, wherein said step of transmitting is performed over two or more ports of said network device.

19. The method as in claim 17, wherein said network device is a switch.

20. The method as in claim 17, wherein said network device is a router.

21. The method as in claim 15, wherein said packet originates from a digital telephone.

22. The method as in claim 15, wherein said packet terminates at a digital telephone.

23. The method as in claim 15, wherein said packet is a voice packet.

24. A system for use with transmitting a packet from a source to a destination, said system comprising:

a source network device having circuitry for:
  (i) assigning a unique sequence number to said packet,
  (ii) replicating said packet into two or more packets, each of said two or more packets carrying the same unique sequence number,
  (iii) assigning a low cost, in a Link State Packet (LSP) routing sense, to links on two or more packet paths from said source to said destination,
  (iv) assigning a high cost, in an LSP routing sense, to links that would connect each of said two or more packet paths to each other, said high cost effectively maintaining a non-converging separateness between said two or more packet paths, and
  (v) transmitting said two or more packets over said low cost two or more packet paths, respectively;

at least one subsequent network device on each of said two or more packet paths having circuitry for forwarding said packet along said respective packet path according to said low cost link arrangement in an LSP routing sense; and a destination network device having circuitry for:
  (i) accepting a first of said two or more packets to arrive at said destination network device, and
  (ii) discarding any of said two or more packets to arrive at said destination network device after said first packet.

25. The system as in claim 24, wherein said initiating network device is a switch.

26. The system as in claim 24, wherein said initiating network device is a router.

27. The system as in claim 24, wherein said packet originates from a digital telephone.

28. The system as in claim 24, wherein said packet terminates at a digital telephone.

29. The system as in claim 24, wherein said packet is a voice packet.

30. A network device for use in sending packets from a source to a destination, comprising:

an input port for receiving packets from a source;

a processor for assigning a low cost, in a Link State Packet (LSP) routing sense, to links on two or more packet paths from said source to said destination, and assigning a high cost, in an LSP routing sense, to links that would connect each of said two or more packet paths to each other, said high cost effectively maintaining a non-converging separateness between said two or more packet paths; and two or more output ports for transmitting said packets to a destination over said two or more packet paths.

31. An initiating network device, comprising:

an input port for receiving a packet; and at least two output ports for transmitting said packet, a first output port of said two output ports to transmit said packet over a first packet path and a second output port of said two output ports to transmit said packet over a second packet path, said first packet path and said second packet path leading to a single destination, said first packet path and second packet path having a low cost in a Link State Packet (LSP) routing sense, each of said first packet path and said second packet path also maintaining a non-converging separateness between each other by having a high cost, in an LSP routing sense, assigned to links that would connect each of said first packet path and said second packet path to each other.

32. A destination network device, comprising:

at least two input ports, a first input port of said at least two input ports to receive a plurality of packets over a first packet path and a second input port of said at least two input ports to receive a plurality of packets over a second packet path, said first packet path and said second packet path leading to a single destination, said first packet path and said second packet path each having a low cost in a Link State Packet (LSP) routing sense, each of said first packet path and said second packet path also maintaining a non-converging separateness between each other by having a high cost, in an LSP routing sense, assigned to links that would connect each of said plurality of packet paths to each other;

circuitry for reading a unique sequence number on each received packet, said circuitry accepting a first of said plurality of packets received with a unique sequence number and discarding any other of said plurality of packets received with the same unique sequence number after said first packet has been received; and an output port for transmitting said packet to a terminating destination.

33. A system for use with transmitting a packet from a source to a destination, said system comprising:

means for assigning a low cost, in a Link State Packet (LSP) routing sense, to links on two or more packet paths from said source to said destination; and means for assigning a high cost, in an LSP routing sense, to links that would connect each of said two or more packet paths to each other, said high cost effectively maintaining a non-converging separateness between said two or more packet paths.

34. The system as in claim 33, further comprising:

means for assigning a unique sequence number to said packet;

means for replicating said packet into two or more packets, each of said two or more packets carrying the same unique sequence number;

means for transmitting said two or more packets over said low cost two or more packet paths, respectively;

means for accepting, at said destination, a first of said two or more packets to arrive at said destination; and means for discarding, at said destination, any of said two or more packets to arrive at said destination after said first packet.

35. A computer readable device having instructions written thereon for practicing a method of, assigning a low cost, in a Link State Packet (LSP) routing sense, to links on two or more packet paths from said source to said destination; and assigning a high cost, in an LSP routing sense, to links that would connect each of said two or more packet paths to each other, said high cost effectively maintaining a non-converging separateness between said two or more packet paths.

36. Electromagnetic signals travelling on a computer network, said electromagnetic signals carrying instructions for execution on a processor for practicing a method of, assigning a low cost, in a Link State Packet (LSP) routing sense, to links on two or more packet paths from said source to said destination; and assigning a high cost, in an LSP routing sense, to links that would connect each of said two or more packet paths to each other, said high cost effectively maintaining a non-converging separateness between said two or more packet paths.

* * * * *